United States Patent [19]

Blum

[11] 4,419,739
[45] Dec. 6, 1983

[54] DECENTRALIZED GENERATION OF SYNCHRONIZED CLOCK CONTROL SIGNALS HAVING DYNAMICALLY SELECTABLE PERIODS

[75] Inventor: Arnold Blum, Gechingen, Fed. Rep. of Germany

[73] Assignee: International Business Machines Corporation, Armonk, N.Y.

[21] Appl. No.: 342,541

[22] Filed: Jan. 25, 1982

Related U.S. Application Data

[63] Continuation of Ser. No. 98,573, Nov. 29, 1979, abandoned.

[30] Foreign Application Priority Data

Dec. 12, 1978 [DE] Fed. Rep. of Germany ....... 2853523

[51] Int. Cl.³ ............................................. G06F 9/00
[52] U.S. Cl. .................................. 364/900; 375/106; 371/61; 365/233
[58] Field of Search ................ 364/200, 900; 365/233; 375/106; 371/61

[56] References Cited

U.S. PATENT DOCUMENTS

| | | | |
|---|---|---|---|
| 4,037,090 | 7/1977 | Raymond, Jr. | 235/152 |
| 4,217,637 | 8/1980 | Faulker et al. | 364/200 |
| 4,241,418 | 12/1980 | Stanley | 364/900 |
| 4,254,475 | 3/1981 | Cooney et al. | 364/900 |
| 4,295,220 | 10/1981 | Blum et al. | 371/61 |
| 4,338,677 | 7/1982 | Morrill, Jr. et al. | 364/900 |

Primary Examiner—James D. Thomas
Assistant Examiner—Archie E. Williams
Attorney, Agent, or Firm—Saul A. Seinberg

[57] ABSTRACT

In a microprogrammed processor consisting of several circuitized chips, which are to be synchronously operated, each chip is provided with its own local clock generator or T-ring for deriving therefrom timing signals required during the subphases of micro instruction execution. A master clock connected to all of the T-rings by lines of equal length forces the individual T-rings to operate synchronously and keeps them operating in such a manner. In addition, reset circuitry is provided for forcing all of the T-rings to their first timing interval for initial synchronization thereof or, at an appropriate time, when a micro instruction requiring less than the maximum number of available T-ring timing signals is executed.

The timing signals which are locally produced are subject to little delay on their way to the various local switching points. Thus, the entire system can be operated at a higher oscillator or master clock frequency to take advantage of the enhanced processing and transfer speeds of modern, highly integrated circuit chips.

6 Claims, 7 Drawing Figures

DECENTRALIZED GENERATION OF SYNCHRONIZED CLOCK CONTROL SIGNALS HAVING DYNAMICALLY SELECTABLE PERIODS

This is a continuation of application Ser. No. 98,573 filed Nov. 29, 1979, now abandoned.

BACKGROUND OF THE INVENTION

1. Field of the Invention

This invention relates to circuitry for generating synchronized clock signals employed in data processing and transmission systems and, more particularly, to generating such clock signals on a decentralized basis for use in multi-chip microprogrammed processors.

2. Description of the Prior Art

In the control of individual processing steps, digital information processing systems require a plurality of control signals by means of which the individual processing elements such as, for example, registers and logic circuits, are activated in a fixed order. In accordance with state-of-the-art practice, these clock control signals are centrally generated in synchronous processing systems and distributed to the individual component groups. For this purpose, the clock control signals are generated from the periodic pulses of a clock by logically combining them with function control signals such as, for example, program instructions and system state indicators. To minimize distortions and time delay effects occurring when the clock control signals are distributed to the user elements, identical line lengths or lines having adjustable delays are used.

However, this type of clock control signal generation is less suitable for systems which employ modern, highly integrated circuit chips. The progress made in circuit technology permits an ever increasing number of functions to be integrated in a single chip, thereby considerably increasing the processing speed and the transfer speed from one logic stage to the next. Because of these enhanced capabilities, the clock frequency at which such circuits operate is very high.

The clock frequency usable when several chips are connected to form a system is substantially reduced as a result of the interconnections which are required, in such a case, between one circuit chip and the next. A decisive factor responsible for this is the delays of centrally generated control signals. The relatively great line lengths and the plurality of logic stages which each entrail different chip dependent delays, limit the clock frequency of the whole system as a function of the signal path having the longest delay. To illustrate this, attention is drawn to the fact that with modern chip technologies, typical delays between two logic stages on a chip amount to several nanoseconds, which the delay of the drivers alone for lines to adjacent chips is of the order of some ten nanoseconds.

A further essential aspect of such systems is the number of connecting points available for each chip, which are largely dependent on the size and the circumference of the circuit chip. If the logic capacity is to be effectively utilized at increased circuit density, the functions executed on a circuit chip have to be chosen in such a manner that the number of connecting points required are reduced to a minimum.

In producing complex systems from highly integrated circuit chips, it has already been proposed in prior art material to couple to each other several independently and asynchronously operating subsystems, each consisting of one circuit chip, see for example Deutsche Offenlegungsschrift No. 24 57 553. However, asynchronous operation necessitates extensive control unit management. If the circuit chips are interconnected by a common bus, for example, each new information exchange necessitates a request procedure for establishing connection. The time requirements this involves are often not tolerable in data processing system. The long and different delays of clock control signals are particularly detrimental in microprogrammed systems, limiting an increase of the system's operating frequency, which would otherwise be possible from the standpoint of circuit technology. During micro instruction processing, the delay resulting from the distribution of centrally generated clock control signals becomes increasingly intolerable, decisively limiting the speed. The principal factors previously responsible for this were the cycle time of the control storage and the delay of the logic stages.

OBJECTS AND SUMMARY OF THE INVENTION

It is, therefore, an object of the present invention to provide an arrangement for generating clock control signals in a synchronously operated system which is adapted to the characteristics and advantages of highly integrated circuit chips.

It is another object of the present invention to provide such an arrangement wherein the synchronous clock control signals are generated in a decentralized manner.

These and other objects of the present invention are achieved by providing each of the chips employed in a data processing system which so require it with their own clock control signal generator. Each of the clock control signal generators are synchronously driven by a system oscillator. Thus, they are each in synchronism with each other. In this arrangement, the clock control signals are derived on each chip from the respective clock control signal generator placed thereon.

The decentralized generation of the clock control signals eliminates delays when passing signals from one chip to another, as well as line adjustments otherwise required. In addition, the delay of the clock control signals on each chip exactly corresponds to the signal delays otherwise encountered on that chip. Thus, it is not necessary to consider, for that chip, the whole range of delay variations of the various other chips. The number of connecting points required for the chips are reduced. In the case of errors, it is relatively simple to determine their cause by indicating the state of the individual clock control signal generators. All facts considered, the invention provides a simple system for generating and distributing clock control signals. All that is required for this purpose are some additional circuit elements per chip, which are practically negligible and economically practical in the case of highly integrated circuits.

DESCRIPTION OF THE PREFERRED EMBODIMENT

Initially, a system for digital information processing in accordance with the art will be described by means of FIGS. 1 to 3, drawing attention to the difficulties inherent in the generation and distribution of clock control signals. The function of this system will be described by way of a simple micro instruction, by means of which two operands contained in registers R1, R2 are added in an arithmetic unit, and the result written back into the storage position of the second operand (instruction code ADD R1, R2).

Figure 1A:
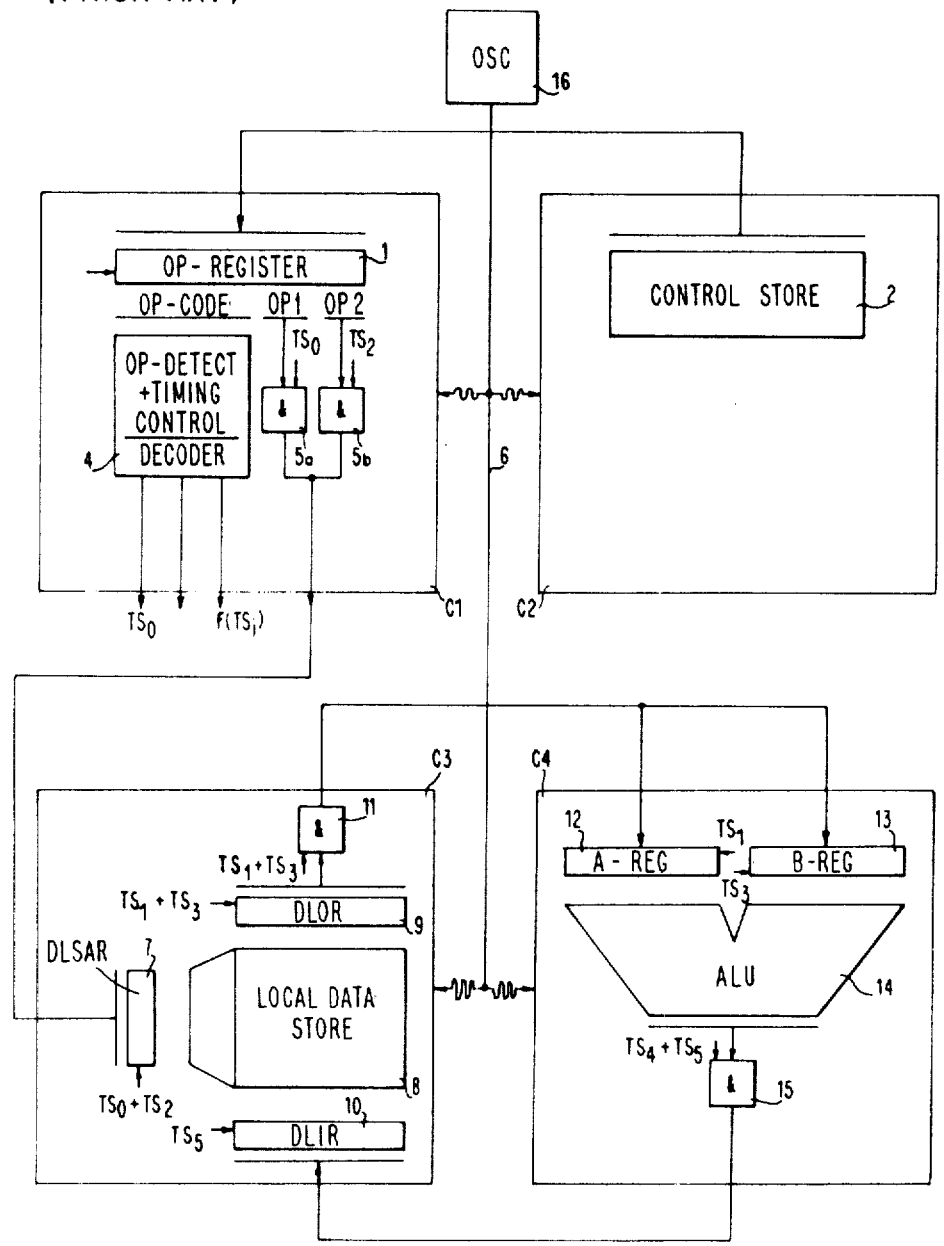
FIG. 1A shows a simplified system for executing a micro instruction, in accordance with prior art practices, in a multi-chip implemented system.
Figure 1B:
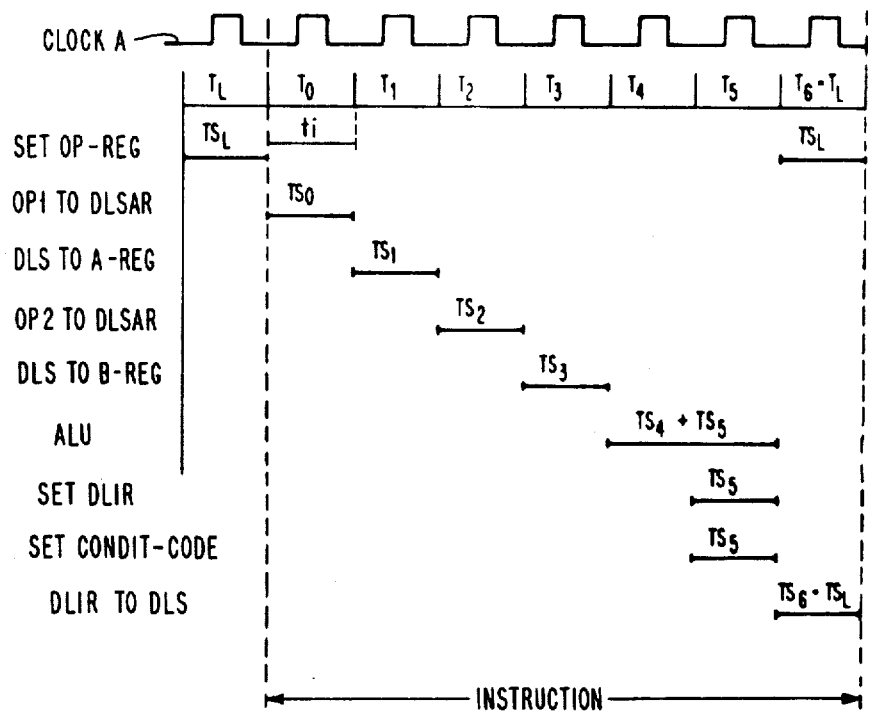
FIG. 1B depicts a time-based diagram of the clock control signals used in executing the micro instruction in the system shown in FIG. 1A.

The elements necessary for this process are shown in FIG. 1A. The clock control signals for executing these instructions are shown in FIG. 1B.

The processing of an instruction in a digital system necessitates several consecutively performed steps over successive time intervals. These time intervals, which are all of the same length, are designated as $T_0$ to $T_L$ (there $T_0$ is the first and $T_L$ is the last of the time intervals) and shown in FIG. 1B. In the example referred to above, a maximum number of seven time intervals are required. Individual instructions may require less than seven time intervals. The time intervals $T_0$ to $T_L$ are generated by cyclic signals of a ring counter or a cyclic shift register (T-ring). The clock control signals characteristic of each micro instruction and corresponding to the representation in FIG. 1B are generated by combining the clock signals of the T-ring with the output signals of the decoder for the operation code OP-CODE. As a result, the so-called clock control signals TS are obtained, by means of which the elements of the system (registers, processing units, etc.) and the data paths arranged between them are controlled during the execution of an instruction.

The time intervals $T_0$ and $T_L$ are fixed with regard to the clock signals of the system clock generator. In one embodiment, the clock pulses (CLOCK A, FIG. 1B) always appear half way through the time intervals $T_i$. The actual data transfer, for example, the gating of data into a register, takes place in a time interval $T_i$ if one of the clock A pulses is simultaneously applied.

FIG. 1A is a schematic representation of the elements of a processor, which are required for executing the instruction ADD R1, R2. The operation of the system will be described in connection with the diagram of the clock control signals in FIG. 1B.

In the last phase of the preceding instruction (time interval $T_L$), the operation register OP-REG 1 is loaded from a control storage CS 2. At the time $T_0$ of the instruction ADD R1, R2 referred to in this case, the OP-CODE has already been read from OP-REG 1 and been fed to unit 4 which decodes the operation code and generates the time control signals $TS_0$ to $TS_L$. During the time $T_0$, the clock control signal $TS_0$, which means "Set Operand Address OP1 in Register DLSAR", is generated for the instruction ADD R1, R2. As a result, AND gate 5a is opened, and the section OP1 of the OP register 1 is read into the address register DLSAR 7 of a local data storage DLS 8. At the time T1, the storage DLS 8 is read via its output register DLOR 9 by means of the clock control signal $TS_1$, and the corresponding storage contents are fed to an A-register 12 via AND gate 11 which is also opened by $TS_1$. Correspondingly, the contents of storage DLS, designated as operand address OP2, are fed to a B-register 13 with the aid of the clock control signals $TS_2$ and $TS_3$. The register contents A and B are combined in an arithmetic and logical unit ALU 14 by means of the clock control signals $TS_4$ and $TS_5$. At the time $T_5$, the result is written into the input register DLIR 10 of the storage DLS. For this purpose, the gate circuit 15 is opened. Also at the time $T_5$, the condition code is set by means of the clock control signal $TS_5$. In the last time interval $T_L$, the clock control signal $TS_L$ causes the contents of register DLIR to be written back into the storage address OP2, which is still contained in the register DLSAR 7, and the next instruction is read from the control storage CS 2.

The blocks C1 to C4 in FIG. 1A show how the elements of the processor can be distributed on different circuit chips. Thus, the clock control signals $TS_0$ to $TS_L$, as well as the functions $f(T_{Si})$ of these clock control signals, are generated on chip $C_1$ and have to be transferred to chips C3 and C4 via drivers and external connections. In addition to the clock control signals $TS_i$, the clock signals CLOCK A of a clock generator OSC 16 are fed to the individual elements via adjusted lines 6 (marked by curved line sections). The function of the different time control signals will be described by way of a register stage shown in FIG. 2.

Figure 2:
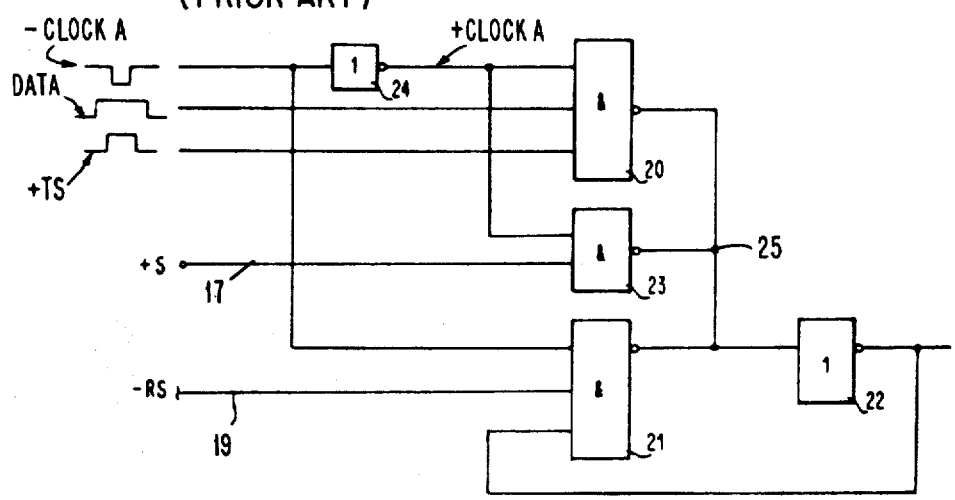
FIG. 2 illustrates the details of a register stage utilized in the system shown in FIG. 1A.

FIG. 2 shows a register stage, of which the registers A, B, etc. of FIG. 1 consist. The stages concerned are state-controlled stages of the D-type flip-flop which are known in the art. The output of the NAND gate 20 is latched via the inverter element 22 and the NAND gate 21 connected thereto via a feedback line, when the inverted clock signal of clock A assumes the logical value 1. The latched state is maintained as long as the inverted clock signal clock A has the logical value 1. The outputs of NAND gates 20, 21, and 23 are dot-ANDed. Thus, when the output of one or more of these gates goes down, is set to a logical "0", and pulls line 25 down, thereby holding or setting the output of inverter 22 at or to a logical "1". Thus, to permit latching the data applied to the NAND gate 20, the data, the clock control signal TS, and the delayed signal "+ clock A", delay being effected by the inverter element 24, have to be simultaneously present at the inputs thereof. The NAND gate 23 and the line 19 serve to respectively reset, line 19 at low level −RS, and set, line 17 at high level +S, the latch circuit.

Figure 3A:
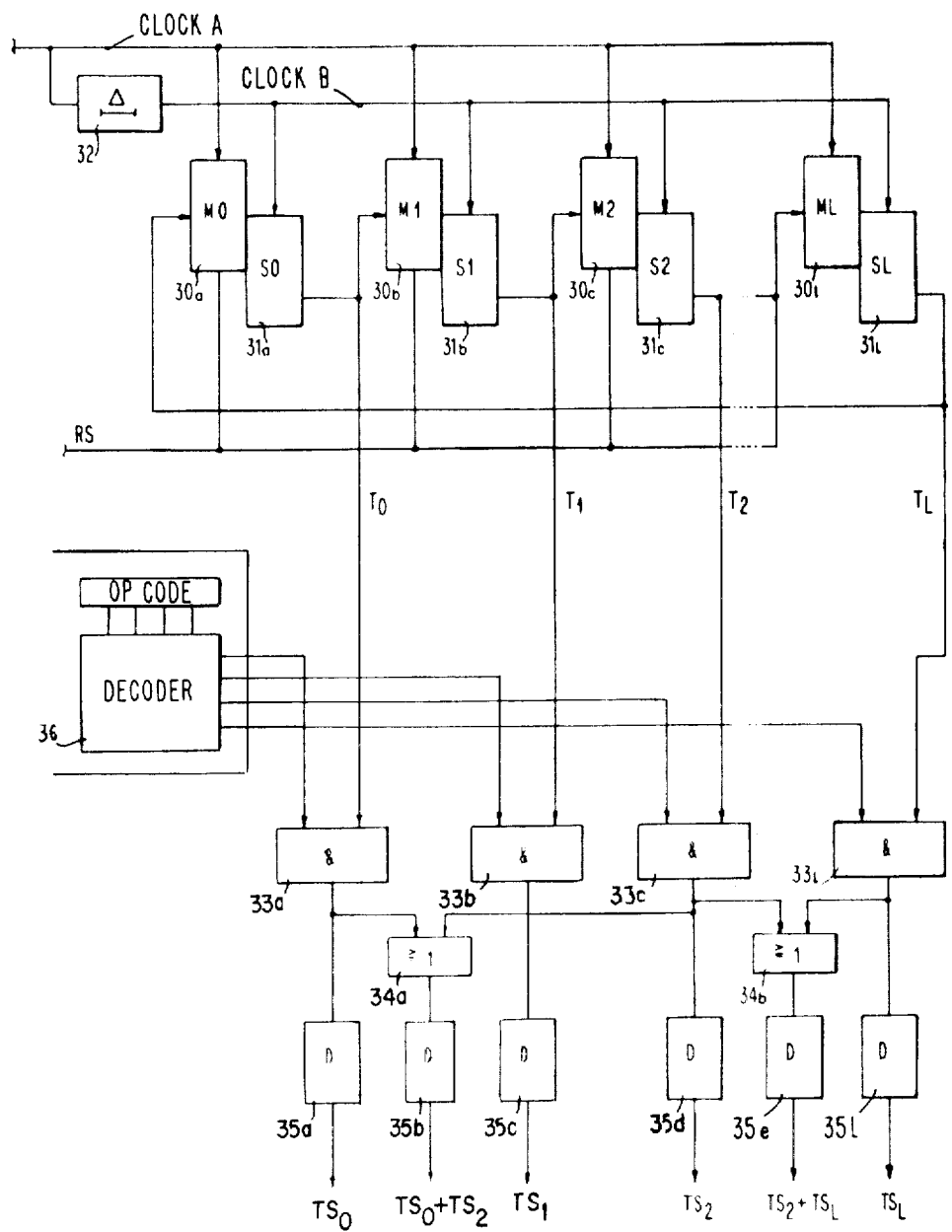
FIG. 3A shows the details of an arrangement for generating clock control signals in accordance with prior art practices.
Figure 3B:
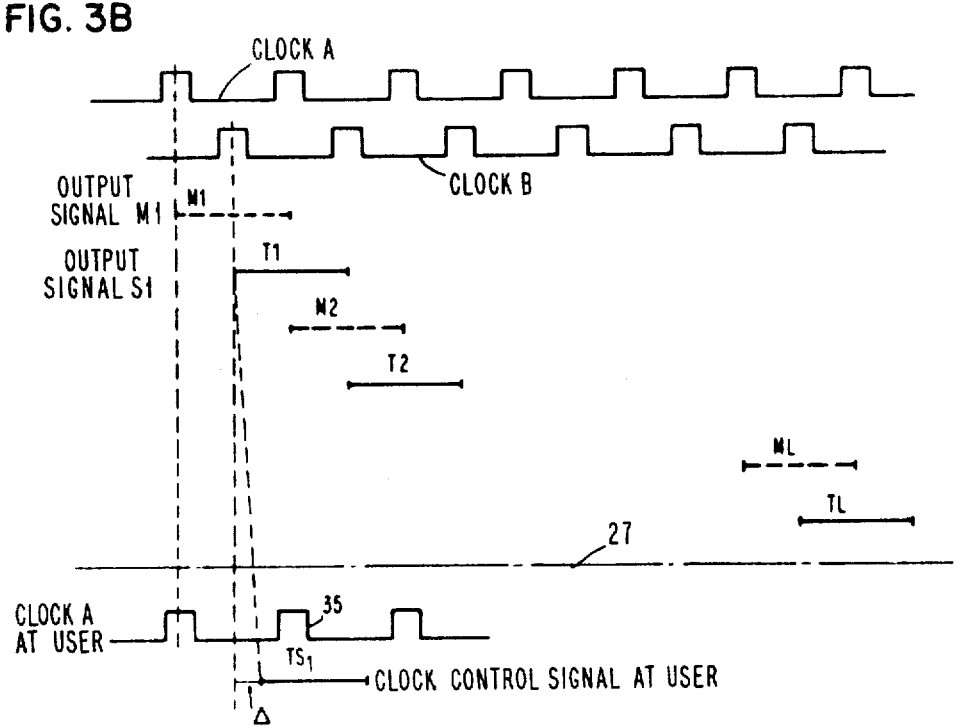
FIG. 3B illustrates the clock control signals generated by the FIG. 3A arrangement as they would be utilized in the FIG. 1A system and the inevitable delay resulting therefrom.

When the clock control signals are centrally generated and subsequently distributed as shown in FIG. 1A, the coincidence of the signals "CLOCK A" and "data", as well as the clock control signal TS, which is necessary for switching the D flip-flop, is jeopardized, if the frequency of the clock generator (clock A) is increased in order to take advantage of the switching speed of highly integrated chips. To explain this more accurately, FIG. 3A shows the generation of the time signals T₀ to T_L and the generation of the clock control signals TS₀ to TS_L. FIG. 3B shows the relative position of these different time signals.

The time signals $T_0$ to $T_L$, which form the actual instruction specific time pattern for the execution of a micro instruction, are derived by means of a delay chain from the periodic pulses of a clock generator circuit which may consist, for example, of an oscillator and a subsequent pulse forming stage. In the example of FIG. 3A, the delay chain is shown in the form of a series connection of so-called master-slave flip-flops 30a and 31a to 30L and 31L. Each of these elements consists, for example, of a pair of D flip-flops, similar to the kind shown in FIG. 2. The output signals of each stage are fed as input signals to the next stage. The output signal of the last stage acts as an input signal for the first stage. By means of a resetting line RS, the master flip-flop of the last stage is set to logical "1", and all the other stages are set to a logical "0". If the signals of the clock generator (clock A) are fed to the master flip-flops M0 to ML and the clock signals delayed in a delay element 32, CLOCK B so delayed, are fed to the slave flip-flops S0 to SL, the logical "1" contained in the last stage is cyclically advanced through the chain, in the manner of a fed back shift register. In such a case, the required time signals $T_0$ to $T_L$ can be tapped at the output of the slave flip-flops S0 to SL. Such an arrangement for generating the time signals $T_i$ constitutes the previously mentioned T-ring. Other circuits for generating the time signals $T_i$ can be used such as, for example, binary modulo counters.

Depending upon the instruction being executed, the time signals $T_0$ to $T_L$ have to be fed to the logic circuits and the registers of the processor. For generating the clock control signals TS₁ to TS_L, the time signals $T_0$ to $T_L$ are combined, specific to the instruction concerned, with signals supplied by the decoder for the OP-CODE. This combination is schematically represented by means of the logic elements 33a to 33L. The decoder for the OP-CODE is symbolized by the switching element 36.

In addition to the simple clock control signals TS_i, more complicated clock control signals are required for some elements, for example, for an element which is active during several time intervals $T_i$. Examples of this are the ALU 14, the AND gates 11 and 15, and the register DLSAR 7 in FIG. 1A. Such combinations of clock control signals are generated, for example, by the OR gates 34a and 34b shown in FIG. 3A. In such a case, the clock control signals are applied to the controlled elements via corresponding driver circuits 35a to 35L which, if necessary, may be used for several control signals in common.

A consequence of the delays in the logic elements 33 and 34, in the lines on which the signals TS_i are fed to the users, and in the line drivers 35a to 35L is that the clock control signals reach the users (e.g., register stages) with a shift Δ (FIG. 3B). The part of FIG. 3B above the dash-dotted line 27 shows the relative position of the input and output pulses of the T-ring in FIG. 3A. The delay of the clock control signal TS₁ at the location of the user with respect to the position of the clock signal clock A is shown in the lower part of FIG. 3B. In accordance with FIG. 2, the clock control signal TS and the corresponding pulse of the clock signal "CLOCK A" must coincide, so that logic element 20, for example, can be switched. The delay Δ must not be so great that it overlaps clock signal 35. If, on the other hand, the delays of the clock control pulses are significant, there is no other choice than to reduce the frequency of the oscillator signal clock A. However, a consequence of this is that the actual operating frequency of the complete system, as afforded by circuit technology, is not fully utilized. It is also possible that so-called metastable states occur, during which, for example, a register is set but the overlap of the control pulses is not sufficient to latch the register. Such an undefined state leads to error conditions which necessitate additional switching means for their elimination.

The bottleneck previously encountered with the clock frequency obtainable, i.e., the delay of the data in the logic stages, is no longer significant because of the increase of the function density and the internal operating speed on the circuit chip.

Figure 4:
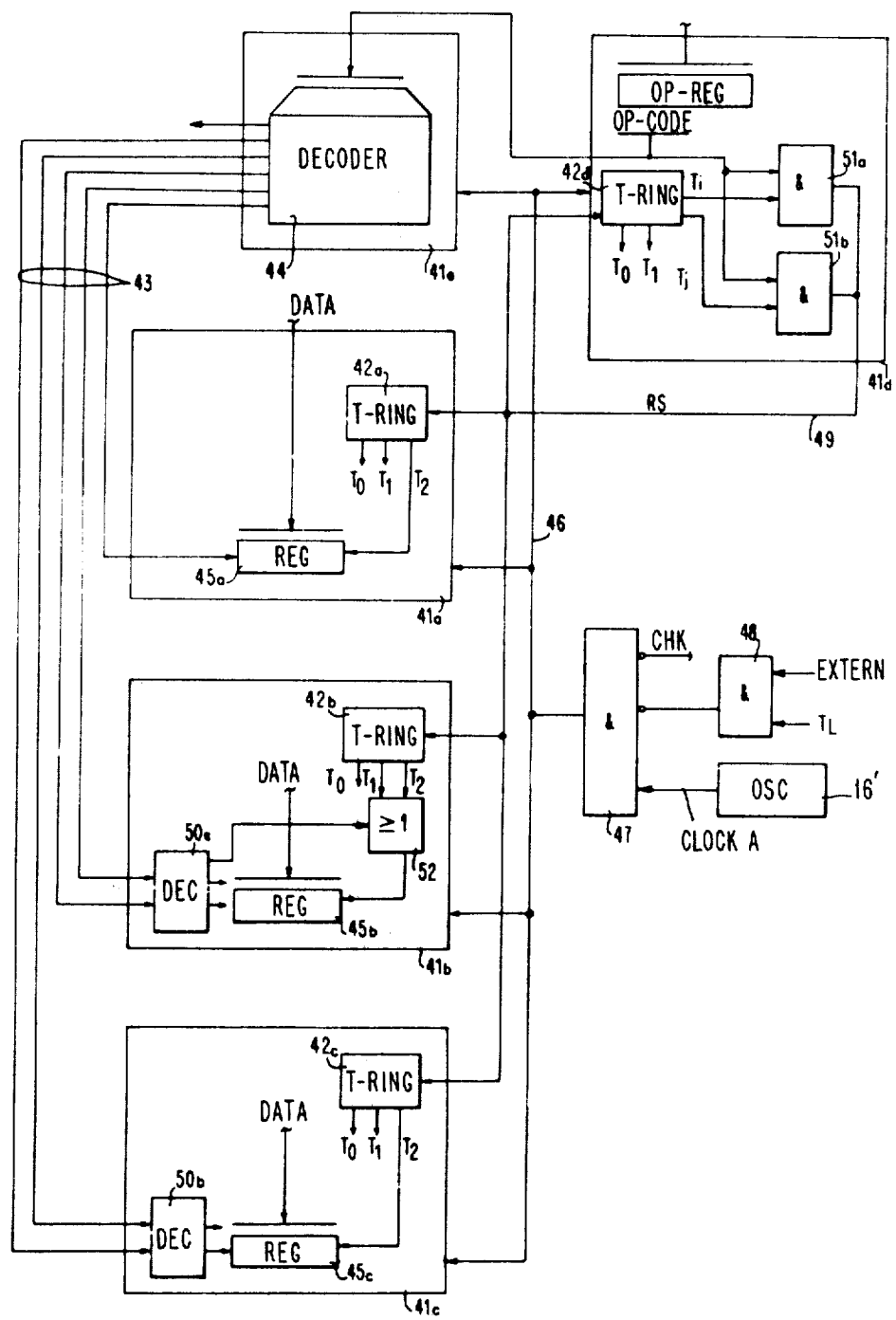
FIG. 4 is a schematic representation of a microprogrammed system having decentralized generation, in accordance with the present invention, of clock control signals.

FIG. 4 is a schematic representation of a data processing system in which such time losses do not impair the operating frequency obtainable. On each of the circuit chips 41a to 41d, whose circuits require clock control signals TS_i, a separate T-ring 42a, 42b, 42c and 42d is respectively arranged. The time signals $T_0$ to $T_L$ generated by these T-rings are directly fed to the switching or control points, e.g., the register stages REG 45a, 45b and 45c, on the chip. The further information necessary for forming a clock control signal from the time control signals is fed from the central decoder 44 for the OP-CODE to the control points on the individual chips via lines 43.

If clock control signals, which are logic functions of time signals $T_i$ are required at a control point, the time signals of the local T-ring pass a logic circuit arranged on the same circuit chip. An example of this is the OR gate 52 on chip 41b with the inputs $T_1$ and $T_2$.

Figure 5:
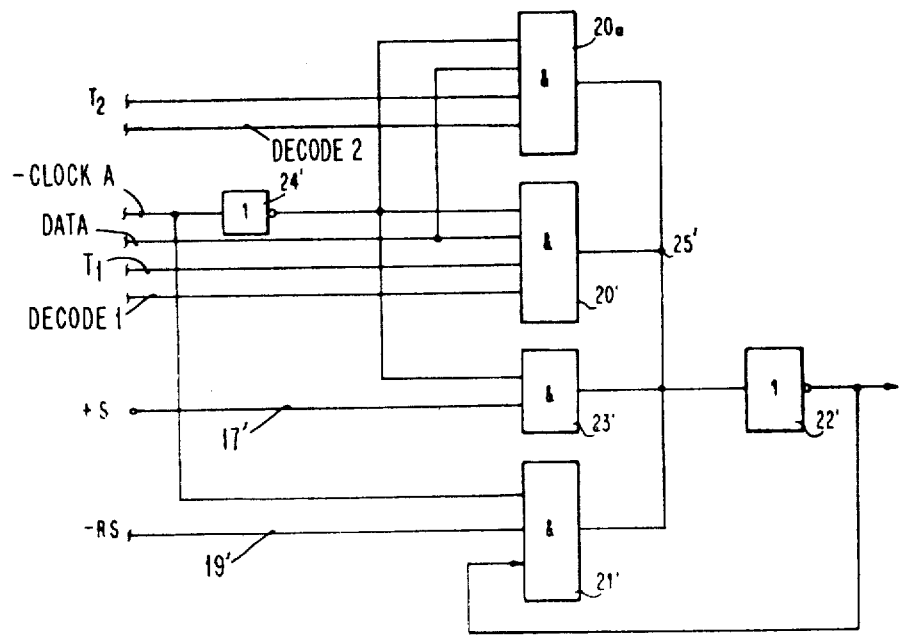
FIG. 5 depicts the details of a register stage which is utilized in the system shown in FIG. 4.

The layout of a register stage controlled in this manner is shown in FIG. 5. The register stage with the elements 20' to 24' is identical with that shown in FIG. 2, with the exception that instead of a single clock control signal TS, two separate signals are applied, the time signal $T_1$ and a signal of the decoder for the OP-CODE (DECODE 1).

The additional AND gate 20a is provided for those cases in which more complicated clock control signals are required. If a clock control signal TS, obtained by combining several time signals $T_j$, had to be applied to the register in FIG. 2, several additional logic elements are necessary, e.g., the OR gates 34A, 34B in the central arrangement for generating clock control signals. In accordance with the above description, these gates or elements can be arranged on the chip proper or may be omitted altogether, if the register stage in FIG. 5 is supplemented by the further AND gate 20a. This gate receives, for example, the data when the time signal T2 and a further decoding signal (DECODE 2) are present; the output of gate 20a is connected to the output of AND gate 20' by DOT-ORing line 25'.

As the clock control signals in accordance with FIG. 4 are generated by circuits having the same characteristics as the controlled circuits, the same delay time per stage, etc., the delay until the arrival of the signals at the switching points is very slight. In addition, for the layout of the system, it is merely necessary to consider the delay of the individual chip, but not the worst conceivable case which may occur when several chips with different characteristics are interconnected.

The control signals required from the decoder for the OP-CODE are of no importance to the delay, since they are available at the control points during the whole execution cycle of an instruction. The partial overlap of instruction execution, as shown in FIG. 1B, reading and decoding during the last phase of the preceding instruction, ensures that these control signals are available at the beginning of instruction execution.

As all of the T-rings 42a to 42d receive the same pulse train, CLOCK A, of the oscillator OSC 16', the individual T-rings operate synchronously to each other by necessity. The lines 46 which supply these pulses to the individual circuit chips are adapted to each other in such a manner that they are all subject to the same delay; i.e., are of the same length. For synchronously switching off the complete system, the supply of the clock pulses, CLOCK A, is centrally interrupted. For this purpose, the logic elements 47 and 48 are used. In response to an external stop signal EXTERN, the supply of the clock signals is interrupted only at the phase $T_L$ of the instruction being executed. A machine stop signal CHK, leads to an immediate interruption of the clock signals A.

The initial synchronization of the T-rings 42a to 42d is effected by a resetting signal RS on line 49, by means of which the state $T_L$ is forced in all rings. The same signal "Reset RS" is also applied during the execution of instructions requiring less than the maximum number of time signals $T_i$. If, for example, in executing a simple operation only 4 phases, $T_0$ to $T_3$ are required, this condition is detected in logic block 51a at the time $T_i=T_2$ and the resetting signal RS is applied to the T-rings via line 49. The logic block 51a constitutes, for example, an AND gate, to the inputs of which the time signal $T_i$ and parts of the OP-CODE are applied. Thus, at the beginning of the execution phase of the next instruction, all T-rings are again in position $T_0$. This applies in analogy to other instructions with another number of time intervals $T_j$. For these, a resetting signal RS is generated in the logic element 51b.

During error-free operation, all T-rings have the same position at any point in time. Thus, errors, even sporadic ones, can be detected by means of the deviating positions of the T-rings concerned.

A further improvement of the system shown in FIG. 4 is that the operation code is not centrally decoded in block 44. Instead, decoding networks are distributed on those circuit chips where there are control points. The main advantage of such distributed decoding is that connecting points for the individual circuit chips are saved. In the place of fanned out, decoded control signals, uncoded or partially decoded control signals are used which require far fewer lines. The additional decoding networks are negligible with highly integrated circuits. Such distributed decoder arrangements are designated as blocks 50a and 50b in FIG. 4.

In an embodiment of the invention which is subject to less critical time requirements, the T-rings 42a to 42b need not be arranged on each of the various circuit chips. It may be sufficient to provide only particular selected circuit chips with local T-rings and to apply the time signals to adjacent chips over short distances.

While the present invention has been described in the context of a preferred embodiment thereof, it will be readily apparent to those skilled in the art, that modifications and variations can be made therein without departing from the spirit and scope of the present invention. Accordingly, it is not intended that the present invention be limited to the specifics of the foregoing description of the preferred embodiment, but rather as being limited only by the scope of the invention as defined in the claims appended hereto.

I claim:

1. Apparatus for generating clock control signals in a microprogrammed digital processing system having a plurality of circuitized chips, each of the chips having local switching points therein, said apparatus comprising:
    (a) first circuit means, located on each chip requiring same, for generating, when started, a fixed number of clock timing signals;
    (b) master clock circuit means, operatively coupled to each of said first circuit means, for generating clock signals and for synchronously driving said first circuit means with respect to each other;
    (c) second circuit means, operatively coupled to said first circuit means, for receiving and decoding operation codes of the micro instructions and for deriving OP-CODE control signals therefrom for use, in conjunction with said clock signals, in developing clock control signals for application to the switching points of each of the individual chips; and
    (d) third circuit means responsive to said OP-CODES and operatively coupled to each of said first circuit means for generating a reset signal therefor to reset each of said first circuit means to their initial timing interval whenever the need arises at any point within a timing cycle to reduce the maximum number of clock timing signals provided per cycle by said first circuit means.

2. The apparatus according to claim 1 wherein said third circuit means includes logic circuit means responsive to said OP-CODE control signals for causing generation of said reset signal whenever a micro instruction requires less than the maximum number of clock timing signals available per cycle from said first circuit means.

3. The apparatus according to claim 2 wherein said second circuit means includes centralized decoding circuit means for receiving and decoding the operation codes and for generating OP-CODE control signals therefrom for application to the switchng points of each of the individual chips.

4. The apparatus according to claim 3 which additionally comprises signal routing means, for operatively coupling by circuit lines of equal length said master clock circuit means and each of said first circuit means.

5. The apparatus according to claim 2 wherein said second circuit means includes decentralized decoding circuit means, located on each chip, for receiving and decoding the operation codes and for generating OP-CODE control signals therefrom for application to the switching points of each of the individual chips.

6. The apparatus according to claim 5 which additionally comprises signal routing means, for operatively coupling by circuit lines of equal length said master clock circuit means and each of said first circuit means.

* * * * *